United States Patent [19]
Givens

[11] Patent Number: 4,464,930
[45] Date of Patent: Aug. 14, 1984

[54] METHOD FOR IDENTIFYING COMPLEX LITHOLOGIES IN A SUBSURFACE FORMATION

[75] Inventor: Wyatt W. Givens, Dallas, Tex.

[73] Assignee: Mobil Oil Corporation, New York, N.Y.

[21] Appl. No.: 411,409

[22] Filed: Aug. 25, 1982

[51] Int. Cl.³ .............................................. E21B 49/00
[52] U.S. Cl. ......................................................... 73/152
[58] Field of Search ........................... 73/152; 324/339; 250/270

[56] References Cited
U.S. PATENT DOCUMENTS
3,256,479  6/1966  Edwards ..................... 73/152 UX

*Primary Examiner*—Jerry W. Myracle
*Attorney, Agent, or Firm*—A. J. McKillop; M. G. Gilman; G. W. Hager, Jr.

[57] ABSTRACT

A method of logging a subsurface formation surrounding a borehole includes the recording of an induced polarization log, the recording of a nuclear log of delayed gamma rays from the activation of aluminum in the formation, and the recording of a nuclear log of inelastic scattering gamma rays from the activation of iron in the formation. The induced polarization log and the nuclear logs are combined to identify the composition of the lithology of the subsurface formation.

8 Claims, 4 Drawing Figures

METHOD FOR IDENTIFYING COMPLEX LITHOLOGIES IN A SUBSURFACE FORMATION

BACKGROUND OF THE INVENTION

In the search for hydrocarbons and in the evaluation of coal and synfuel type deposits, drilling represents an expensive commitment. A drilled hole can become worthless unless basic logs taken in such a hole can provide information vital to evaluating the potential of the surrounding area. If the lithology of the area is simple and known, analysis of the logs will give good values of the parameters needed to evaluate a reservoir and to determine reserves. However, the complex composition of mixed lithologies being encountered worldwide in oil and gas exploration and production have greatly complicated log analysis and current log analysis methods are not adequate in many areas. The need is for logs to specifically and quantitatively identify basic rock types (limestone, dolomite, sandstone, and mixtures of these), clay type and volume, and minerals that adversely affect the logs used to estimate reserves. The practice of cross plotting the basic porosity logs (sonic, density, and neutron) to identify lithology is at best semiquantitative even though used for quantitative corrections. This practice introduces error of unknown magnitude in the basic log-derived parameters of porosity, oil saturation and water saturation.

Large surface area smectite clays, such as montmorillonite, are often associated with low resistivity (high water saturation) sands that produce almost water-free oil or gas. The basic logs correctly show these formations to have water saturations in the range of 60 to 90. Clean sands that show this range of water saturation produce much water and little if any oil or gas. Water is bound to the clay surface and is not produced in one case but is freely produced in the other. The problem is that the basic logs don't show a unique difference between the two types of formations.

SUMMARY OF THE INVENTION

In accordance with the present invention there is provided a method for identifying complex lithologies in a subsurface formation surrounding a borehole. The borehole is logged to produce an induced polarization log, a nuclear log of delayed gamma rays from the activation of aluminum in the formation, and a nuclear log of inelastic scattering gamma rays from the activation of iron in the formation. The formation is identified as a low resistivity sand with a large surface area clay that produces water-free oil or gas when the combination of the induced polarization log and the nuclear logs indicate a large induced polarization, no inelastic scattering gamma rays from iron, and delayed gamma rays from aluminum. The formation is identified as a clear sand with a small surface area clay that produces water and little or no oil or gas when the combination of the induced polarization log and the nuclear logs indicate a small induced polarization, inelastic scattering gamma rays from iron and no delayed gamma rays from aluminum.

More particularly, the induced polarization log is produced by introducing an electrical current into the formation through a pair of in-situ current electrodes and the resulting out-of-phase voltage in the formation is measured, such voltage representing the reactive component of the electrical impedance of the formation. The nuclear log of delayed gamma rays is produced by irradiating the formation with neutrons of sufficient energy to produce delayed gamma rays of about 1.78 MEV from the activation of aluminum in the formation. The nuclear log of inelastic scattering gamma rays is produced by irradiating the formation with neutrons of sufficient energy to produce inelastic scattering gamma rays of about 0.847 MEV from the activation of iron in the formation.

DESCRIPTION OF THE PREFERRED EMBODIMENT

The present invention is directed to a new logging method for identification of the composition of complex lithologies being encountered in oil and gas exploration and production, and more particularly to the identification of low resistivity sands associated with large surface area clays that produce mostly water-free oil and gas. Iron and iron minerals adversely affect neutron and density logs, basic logs for measuring porosity. Pyrite, a conductive iron mineral, can also affect electric logs causing them to indicate a higher than actual water saturation. Large surface area clays and pyrite produce a large induced polarization (IP) response. Clean sands, low surface area clays, and other iron minerals produce a much smaller IP response. The method of present invention permits the identification of these various types of compositions through the combination of an IP electrical log, a nuclear log to identify characteristic elements of clays, such as aluminum, and a nuclear log to identify iron.

Figure 1:
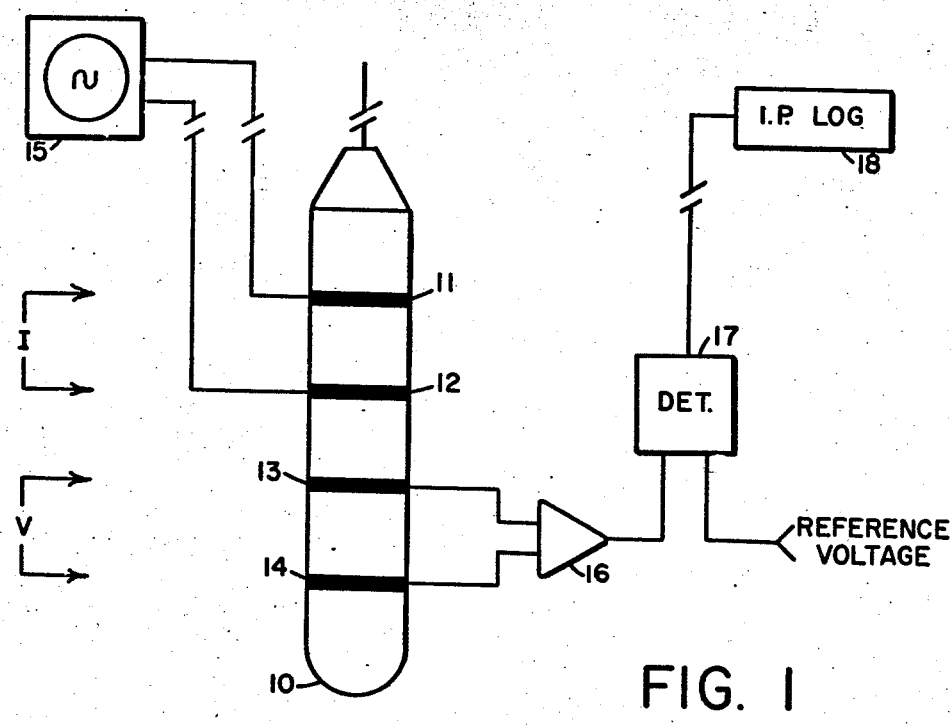
FIGS. 1 and 2 illustrate logging systems for recording an induced polarization log of formations surrounding a borehole.

A logging sonde for carrying out these in-situ IP and nuclear measurements for identifying complex lithologies will now be described. Referring to FIG. 1, there is shown the logging sonde 10 employing a dipole-dipole array for carrying out induced polarization measurements. Basically, induced polarization logging is a method in which electrical current is induced in the formation surrounding the borehole through the pair of current electrodes 11 and 12 and the resulting out-of-phase voltage is measured across the pair of voltage electrodes 13 and 14. This voltage measurement represents the quadrature or reactive component of the electrical impedance of the formation. A more complete description of the induced polarization phenomenon is set forth by S. H. Ward and D. C. Frazer in "Conduction of Electricity In Rocks," Mining Geophysics, 1967, v.2, pgs. 198-223. A description of induced polarization as it relates to borehole logging, along with a detailed description of a logging sonde for carrying out such induced polarization measurements in-situ is set forth in U.K. patent application No. 2,068,563, filed Jan. 23, 1981 and published Aug. 12, 1981, which patent application is incorporated herein by reference.

Briefly, however, an AC current source is coupled to the pair of electrodes 11 and 12. The voltage measured across the pair of electrodes 13 and 14 is applied to a differential amplifier 16. The signal from amplifier 16 is compared by the phase detector 17 with a reference voltage which is proportional to the AC current supplied to the pair of current electrodes 11 and 12. Phase detector 17 measures the in-phase $V_1$ and quadrature $V_2$ components and the phase angle $\theta$ between the $V_1$ and $V_2$ components of the signal from amplifier 16 by comparing such signal with the reference voltage. Such measured quadrature component $V_2$ may be either a positive quadrature component (negative IP phase shift $\phi$) leading the AC current input depending on the characterization of the formation surrounding the borehole. Such measurements of the induced polarization of the formation surrounding the borehole is then recorded up-hole in the form of an IP log in correlation with the depth of the sonde within the borehole.

Figure 2:
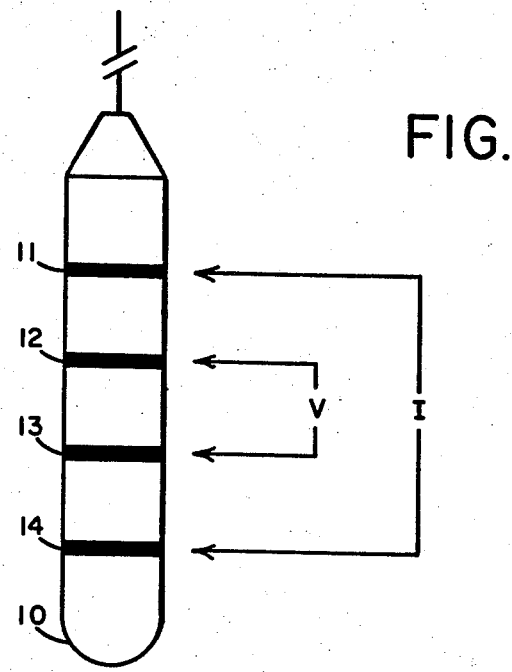

An alternate arrangement, termed the Wenner Array, for the current and voltage electrodes is illustrated in FIG. 2. While the dipole-dipole array of FIG. 1 will yield the best resolution, the Wenner Array will yield the best sensitivity.

Figure 3:
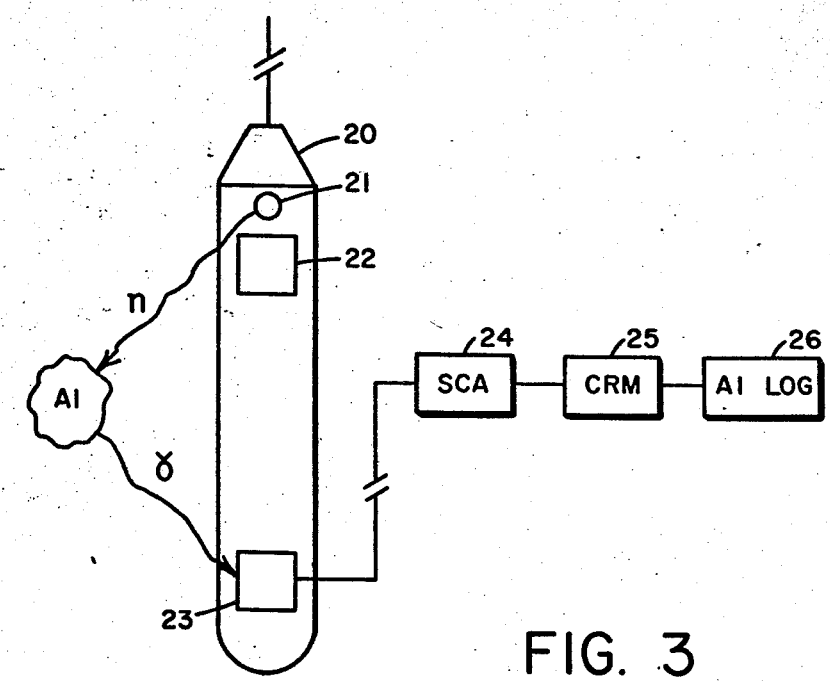
FIG. 3 illustrates a logging system for recording a nuclear log of delayed gamma rays from the activation of aluminum in the formations surrounding a borehole.

A logging sonde for carrying out nuclear measurements in-situ for identifying characteristic elements of clays, such as aluminum, will now be described in conjunction with FIG. 3. The logging sonde 20 includes a neutron source 21, preferably a Californium-252 source, a neutron shield 22, and a gamma-ray detector 23, preferably a NaI scintillation detector. The average energy of neutrons from the Californium-252 neutron source 21 is about 2.348 MEV and is sufficient to produce delayed gamma radiation of 1.78 MEV from the activation of any aluminum in the formation in accordance with the following activation reaction:

$$^{27}Al(n,\gamma)^{28}Al \qquad (1)$$

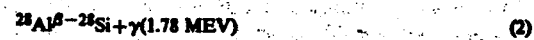

$$^{28}Al^{\beta-}{}^{28}Si+\gamma(1.78\ MEV) \qquad (2)$$

The spacing between the neutron source 21 and the gamma-ray detector 23 is selected to yield maximum response by the gamma-ray detector 23 to the 1.78 MEV aluminum gamma rays. A particularly suitable spacing is in the order of 5 to 6 feet.

The gamma-ray measurement from detector 23 is applied uphole to the single-channel analyzer 24 which is biased to pass to the count rate meter 25 only those amplified signals from detector 23 that are in an energy window centered about 1.78 MEV gamma rays. It is in this energy band that the most intense gamma rays from any aluminum element present in the formation are produced. The count rate from count rate meter 25 is recorded on the recorder 26 as the measure of aluminum content with depth in any clay-bearing formation surrounding the borehole being logged.

Figure 4:
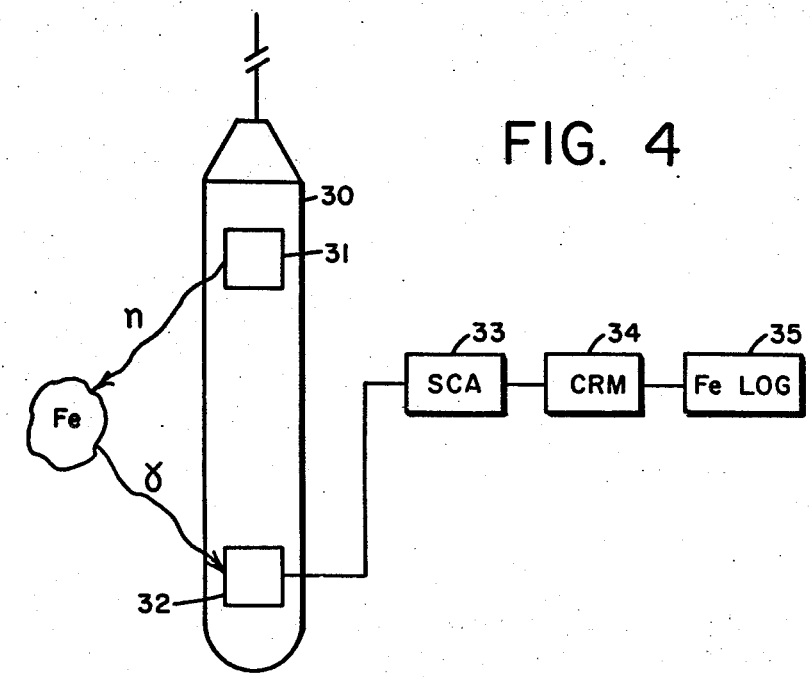
FIG. 4 illustrates a logging system for recording a nuclear log of inelastic scattering gamma rays from the activation of iron in the formations surrounding a borehole.

A logging sonde for carrying out nuclear measurements in-situ for identifying iron present in the formations will now be described in conjunction with FIG. 4. The logging sonde 30 includes the neutron source 31 and the gamma-ray detector 32. Neutron source 31 is preferably a relatively moderate energy deuterium-deuterium source producing neutrons of about 2.5 to 2.56 MEV. Pulsing of the neutron source 31 is carried out in response to a trigger pulse supplied by the uphole system. The output of the neutron source 31 is a burst of fast neutrons spaced in time for irradiation of the formation surrounding the borehole.

The gamma-ray detector 32 is preferably a bismuth germenate high-Z scintillator of the type supplied by Harshaw Chemical Company. Other suitable detectors would be the sodium iodide scintillator or the cesium iodide scintillator on a germanium solid-state photon detector. The output of gamm-ray detector 32 is applied uphole to the single channel analyzer 33, count rate member 34 and recorder 35. With a neutron source energy level of 2.56 MEV, any $^{56}Fe$ element present in the formation surrounding the borehole will be activated to produce 0.847 MEV inelastic scattering gamma rays only during the neutron burst time period. Single channel analyzer 33 is biased with an energy window centered around gamma-ray pulse heights of 0.847 MEV energy level so as to maximize the measurement of gamma rays from any $^{56}Fe$ element within the formation. The count rate meter 33 counts the gamma rays passed by the single channel analyzer 32. Such a count of $^{56}Fe$ gamma rays is then recorded on the recorder 35 as the measure of the iron element content with depth in the formation surrounding the borehole being logged.

It is to be understood that the description of separate in-situ measuring equipment and uphole recording equipment for each of the induced polarization and nuclear logging operations was for purposes only of describing the methods by which the IP log, the iron log, and the aluminum log are preferably generated. The three logs could be generated by the use of a single logging sonde incorporating the required in-situ components for each measurement. Such measurements could be recorded on a single uphole recording system utilizing similar components on a time-shared basis.

Having described the production of the IP, iron and aluminum logs, the use of such logs in identifying low resistivity sands associated with large surface area clays from which water-free oil or gas can be produced will now be described in conjunction with the following mineral identification table.

TABLE

| Mineral | IP$\phi$ | FE | AL |
|---|---|---|---|
| Pyrite | Large (lag) | Yes | No |
| Siderite | Small (lag) | Yes | No |
| Montmorillonite (Large Surface Area) | Large (lead) | No | Yes |
| Kaolinite (Small Surface Area) | Small (—) | No | Yes |

It is a specific feature of the present invention to use an IP electrical log, a nuclear log to identify iron, and a nuclear log to identify characteristic elements of clays, such as aluminum, in accordance with the foregoing table to distinguish between (i) large surface area clays, such as montmorillonite associated with low resistivity sands, that, even though having a high water saturation, produce almost water-free oil or gas and (ii) clean sands and small surface area clays that have a high water saturation and produce much water and little if any oil or gas. It can be seen from the foregoing table that the combination of the three logs, IP, Fe and Al, does uniquely distinguish between these two types of high water saturation formations.

I claim:

1. A method for identifying complex lithologies in a subsurface formation surrounding a borehole, comprising the steps of:

(a) recording an induced polarization log of said formation, (b) recording a nuclear log of delayed gamma rays from the activation of aluminum in said formation, (c) recording a nuclear log of inelastic scattering gamma rays from the activation of iron in said formation, and (d) combining said induced polarization log and said nuclear logs to identify the composition of the lithology of said formation.

2. The method of claim 1 wherein said step of recording an induced polarization log comprises the steps of:

(a) introducing an electrical current into said formation through a pair of in-situ current electrodes, and (b) measuring the resulting out-of-phase voltage in said formation through a pair of in-situ voltage electrodes, said voltage representing the reactive component of the electrical impedance of said formation.

3. The method of claim 2 wherein said measured out-of-phase voltage leads said electrical current.

4. The method of claim 2 wherein said measured out-of-phase voltage lags said electrical current.

5. The method of claim 1 wherein said step of recording a nuclear log of delayed gamma rays from the activation of aluminum comprises the steps of:

(a) irradiating said formation with neutrons of sufficient energy to produce delayed gamma rays of about 1.78 MEV from the activation of aluminum in said formation, and (b) measuring said delayed gamma rays within an energy window centered about 1.78 MEV.

6. The method of claim 1 wherein said step of recording a nuclear log of inelastic scattering gamma rays from the activation of iron comprises the steps of:

(a) irradiating said formation with neutrons of sufficient energy to produce inelastic scattering gamma rays of about 0.847 MEV from the activation of iron in said formation, and (b) measuring said inelastic scattering gamma rays within an energy window centered about 0.847 MEV.

7. The method of claim 1 wherein said formation is identified as a low resistivity sand with a large surface area clay that produces water-free oil or gas when the combination of said induced polarization log and said nuclear logs indicates a large induced polarization, no inelastic scattering gamma rays from iron and delayed gamma rays from aluminum.

8. The method of claim 1 wherein said formation is identified as a clean sand with a small surface area clay that produces water and little or no oil or gas when the combination of said induced polarization log and said nuclear logs indicates a small induced polarization, inelastic scattering gamma rays from iron and no delayed gamma rays from aluminum.

* * * * *